Jan. 7, 1930.  C. A. WIDDER ET AL  1,742,491
SHOE MACHINERY
Filed Feb. 13, 1928  7 Sheets-Sheet 1

CHARLES A. WIDDER
GEORGE CODISH.
INVENTORS

BY Victor J. Evans
ATTORNEY

WITNESS

Jan. 7, 1930.  C. A. WIDDER ET AL  1,742,491
SHOE MACHINERY
Filed Feb. 13, 1928  7 Sheets-Sheet 2

CHARLES A. WIDDER
GEORGE CODISH.
INVENTORS

BY Victor J. Evans
ATTORNEY

Jan. 7, 1930.  C. A. WIDDER ET AL  1,742,491
SHOE MACHINERY
Filed Feb. 13, 1928    7 Sheets-Sheet 6

CHARLES A. WIDDER
GEORGE CODISH.
INVENTORS

BY Victor J. Evans
ATTORNEY

Patented Jan. 7, 1930

1,742,491

UNITED STATES PATENT OFFICE

CHARLES A. WIDDER, OF BRONX, AND GEORGE CODISH, OF NEW YORK, N. Y.

SHOE MACHINERY

Application filed February 13, 1928. Serial No. 254,048.

This invention relates to improvements in shoe machinery and has particular reference to a shoe edge cutting machine.

The primary object of the invention resides in a machine for cutting the edges of shoe soles and embodies means for supporting and clamping the edge to be cut, cutting the edge, and feeding the edge a predetermined distance preparatory to the next successive clamping and cutting operation.

Another object of the invention is to provide a machine capable of performing the above functions and which produces a smooth and even finished edge upon the sole of a shoe.

A further object of the invention is the provision of an edge cutting machine embodying an intermittently rotatable turn-table or rest and a reciprocable knife co-acting in timed relation therewith to sever that portion of the shoe edge overlying the turn-table, the turn-table and its operating mechanism being embodied in a removable unit for adjustment with respect to the knife for varying the width of the shoe edge to be formed.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 14 is a collective perspective view of the operating cams.

Referring to the drawings by reference characters, the numeral 10 designates our improved edge cutting machine in its entirety which includes a lower housing 11, an upper housing 12, and a top cover 13 removably secured to the upper housing and by the removal of which access may be had to the working parts contained within the upper housing. A removable plug 14 closes a filling opening in the top cover through which oil may be poured to lubricate the working parts contained therein. The upper housing section is provided with a removable side plate 15 and a removable front plate 16 for allowing access to the working parts when desired. A drain cock 17 is tapped into the upper housing for draining the oil therefrom when necessary.

Journalled in the walls of the housing section 12 and extending transversely therethrough is a driven rotatable shaft 18 having a pulley wheel 19 fixed to one of the projecting ends of the shaft. An endless belt 20 passes over the pulley 19 and over the pulley 21 on the driven shaft of an electric motor 22 bolted to the base 23 on which the machine is rigidly mounted. Although an electric motor has been shown for transmitting power to the shaft 18, it will be understood that any other means may be provided if desired. Fixedly mounted on the shaft 18 and concealed within the housing are cams 24, 25, 26 and 27 which are so shaped and arranged with respect to each other as to operate their respective mechanisms hereinafter fully described, in timed accord.

The lower housing 11 is open at its front and has its inner side walls provided with tracks 28 for slidably supporting a shoe rest unit 29. The shoe rest unit 29 includes a box-like frame structure 30 having a rack bar 31 along one of its top longitudinal edges and with which a gear 32 meshes. The gear 32 is fixed to the inner end of a shaft 33 journalled in one of the side walls of the housing while a hand wheel 34 is fixed to the outer end thereof. By imparting rotation to the hand wheel, the unit may be adjusted for a purpose to be hereinafter explained. Journalled in the frame 30 of the unit is a vertical stub shaft 35 having a turn-table or rest 36 integral therewith and which is adapted to be intermittently rotated on a horizontal plane. The shaft 35 is connected to a shaft 37 journalled in the frame structure and arranged at an angle with respect to the axis of the shaft 35. The two shafts 35 and 37 are operatively connected together by a flexible joint 38. Fixed to the lower end of the shaft 37 is a disk 39 adapted to rotate on a plane at right angle to the axis of the shaft 37 on which it is fixedly mounted. It is the purpose of this invention to impart an intermittent turning movement to the turntable 36 through the disk 39 and flexibly connected shafts and for performing this function we provide a pair of co-acting clamping jaws 40 and 41 having friction surfaces 42 on their inner faces for clamping engagement with opposite sides of the disk 39. The jaws are swingingly connected to an arm 43 by flat springs 44 which tends to normally force the jaws into clamping engagement with the disk but which allows them to be expanded to release the disk. The arm 43 is pivoted to the frame structure 30 as at 45 for a predetermined lateral movement. A rod 46 is fixed to the jaw 40 and freely passes through the jaw 41 and carries a head or nut 47 at its outer end between which and the jaw 41 and an expansion spring 48 is interposed. This spring also places a tension upon the jaws to cause them to tightly clamp upon the disk 42 so that when the arm 43 is swung in one direction the disk will be turned a predetermined distance. The lateral movement of the arm 43 is caused by a cone shaped roller or cam 49 slidably mounted upon a rod 50. An expansion spring 51 encircles the rod 50 and tends to normally hold the roller against the top of the frame structure in which it is mounted so that the smaller end of the roller lies against the side of the arm 43. A rod rises from the cone roller above the top of the casing and carries a disk or plate 52. By pressing downward upon the plate 52, the cone roller will be depressed causing the arm to move laterally against the action of a tension spring 53 which returns the arm to its former position upon the release of the jaws 40 and 41 from the disk 39.

The downward movement of the cone roller 49 is caused by the cam 26 which actuates a rocker arm 54 journalled in a bearing within the housing. The rocker arm 54 has a roller 55 carried by one end with which the cam engages while the other end of the rocker arm is disposed in the path of a push rod 56 slidably mounted within the housing and having a foot or plate 57 which engages the disk 52 of the cone roller. An expansion spring 58 tends to normally hold the rod in a raised position and returns the same after each depression of the same by the rocker arm. The cam 26 operates the rocker arm to depress the cone 49 twice on each revolution of the cam shaft 18.

Figure 1:
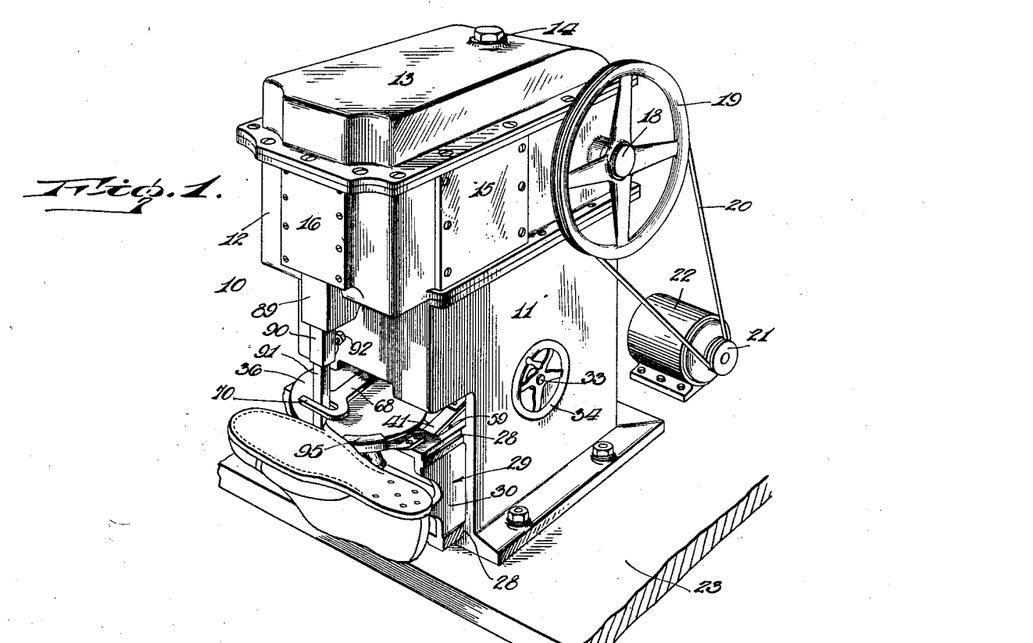
Figure 1 is a perspective view of our edge cutting machine.
Figure 2:
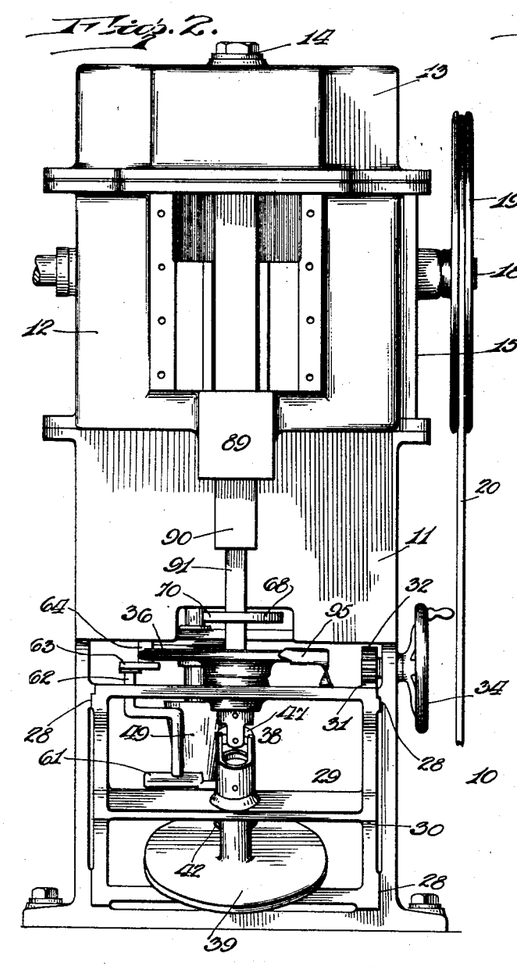
Figure 2 is a front elevation of the same with the front cover plate removed.
Figure 3:
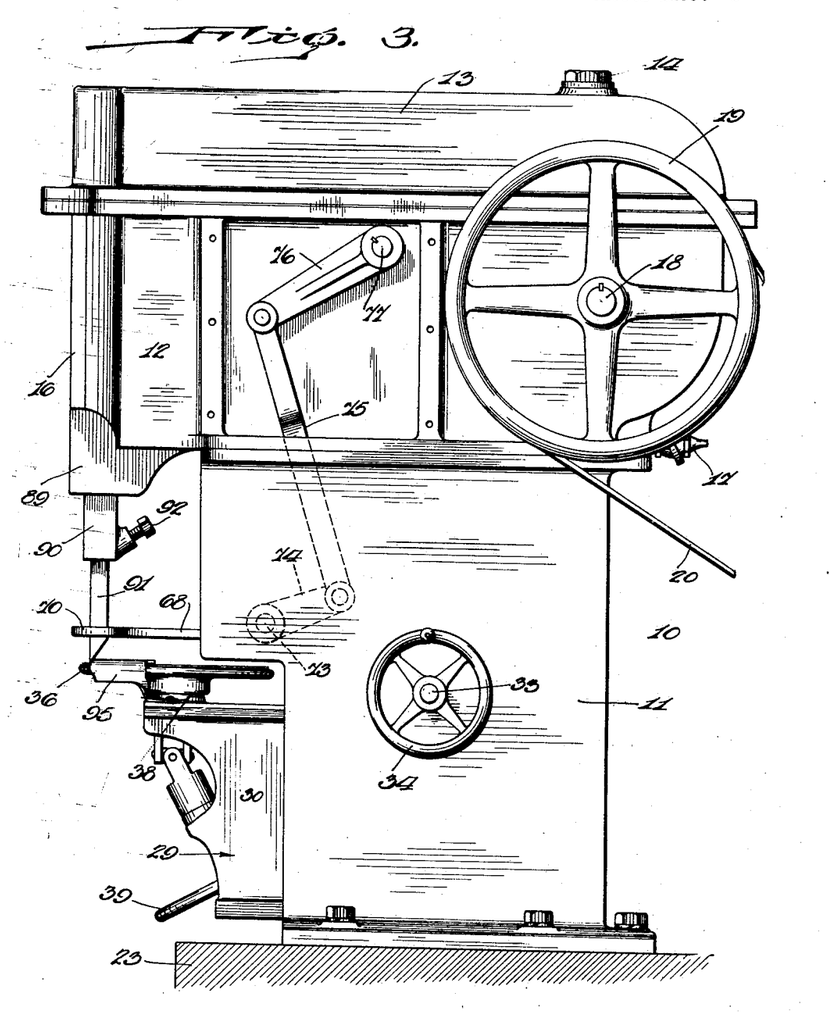
Figure 3 is a side elevational view with the side cover plate removed.
Figure 4:
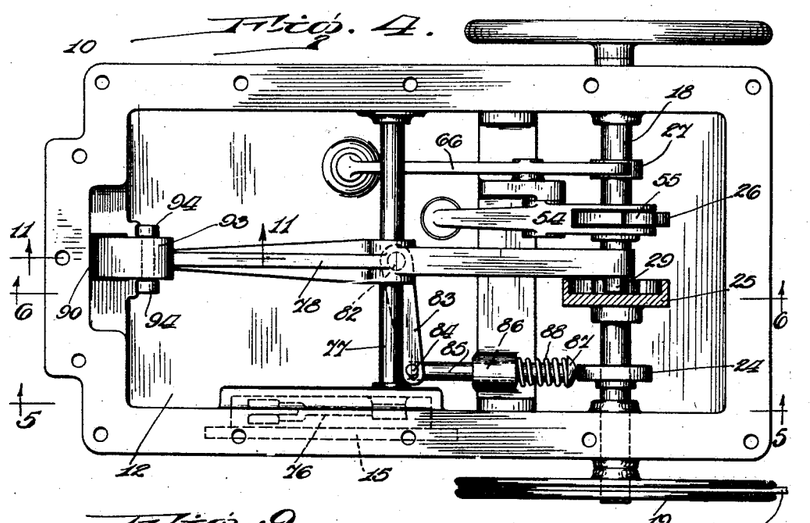
Figure 4 is a top plan view with the top cover plate removed.
Figure 5:
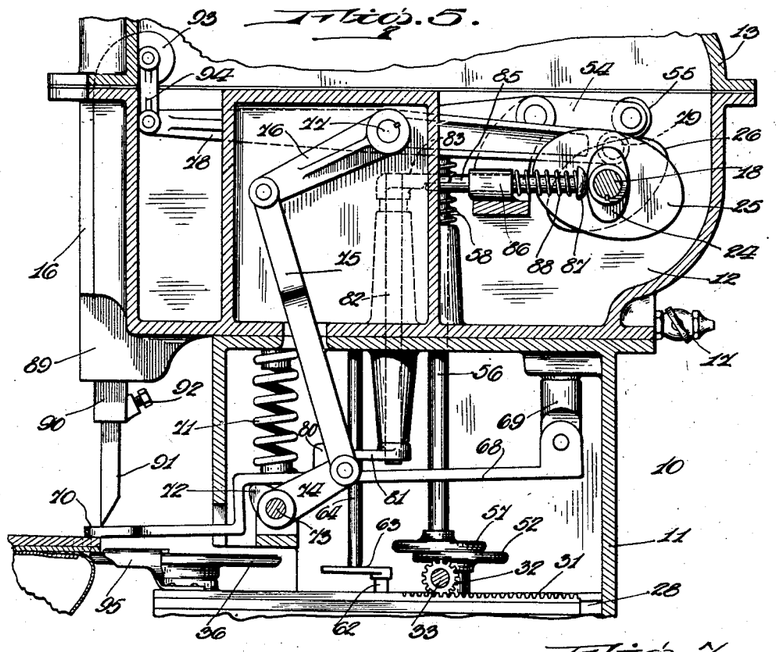
Figure 5 is a vertical longitudinal sectional view on the line 5—5 of Figure 4.
Figures 6, 12:
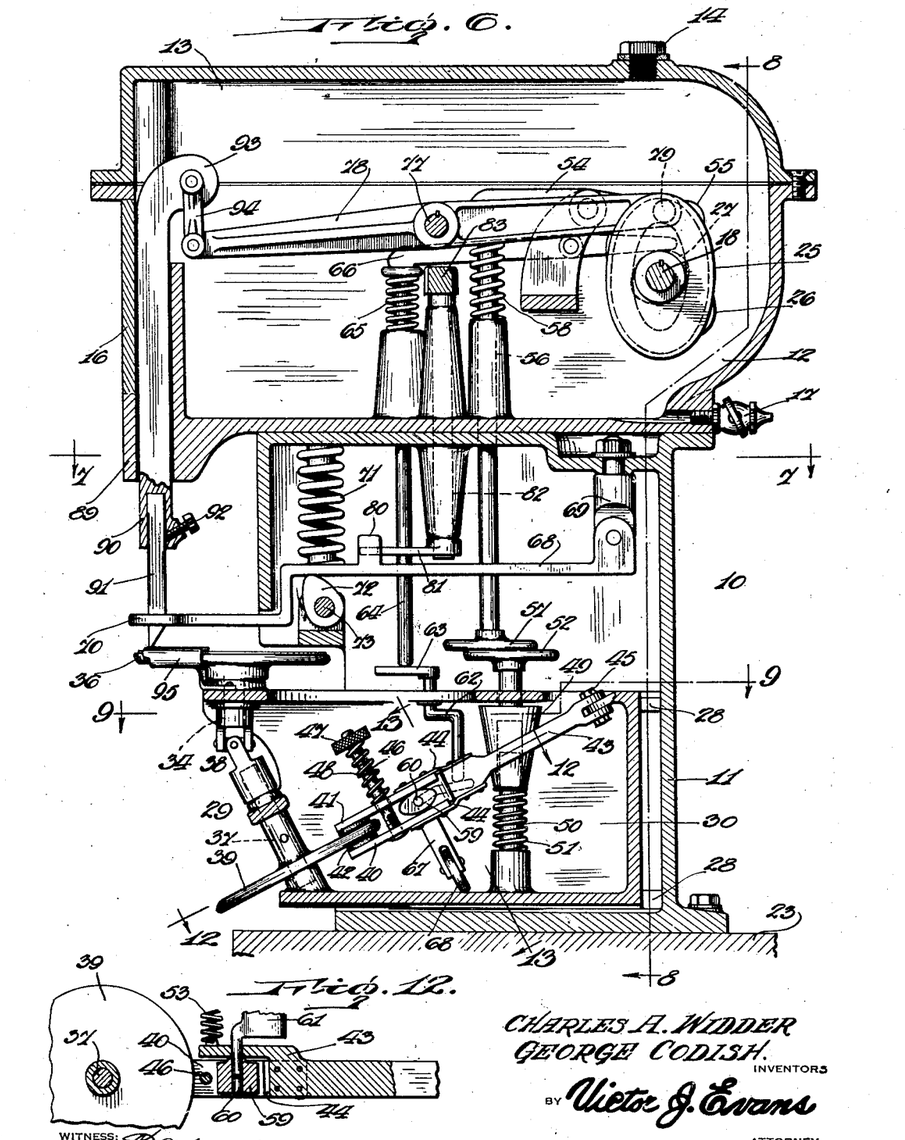
Figure 6 is a similar view on the line 6—6 of Figure 4.
Figure 12 is a detail sectional view on the line 12—12 of Figure 6.
Figure 7:
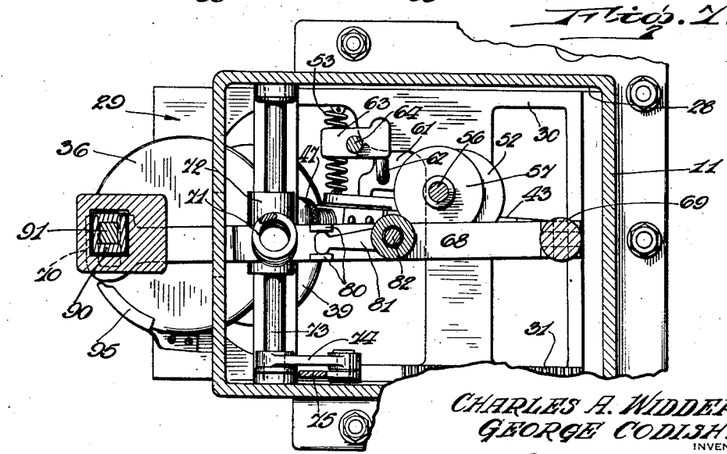
Figure 7 is a horizontal sectional view on the line 7—7 of Figure 6.
Figure 8:
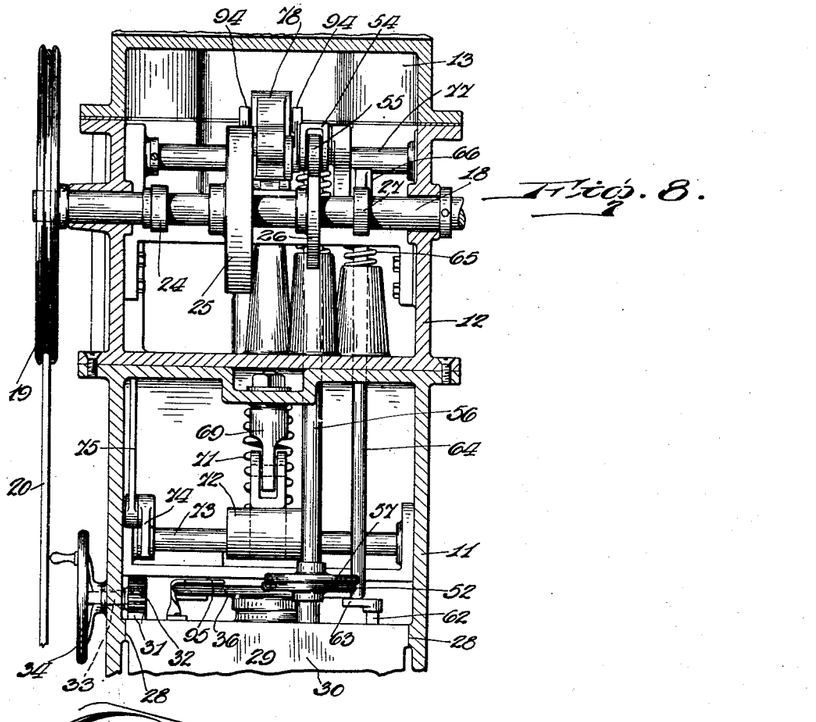
Figure 8 is a vertical transverse sectional view on the line 8—8 of Figure 6.
Figure 9:
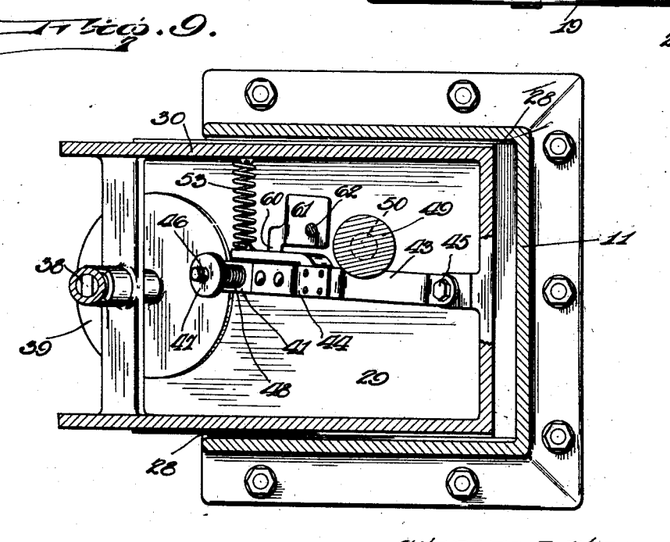
Figure 9 is a horizontal sectional view on the line 9—9 of Figure 6.
Figure 10:
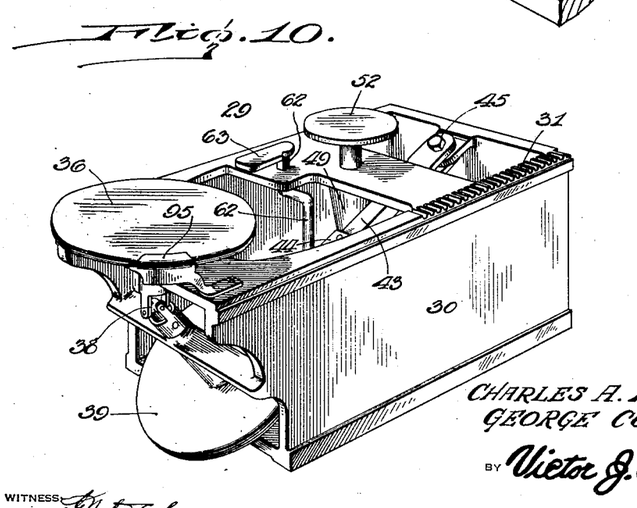
Figure 10 is a detail perspective view of the turntable unit.
Figure 11:
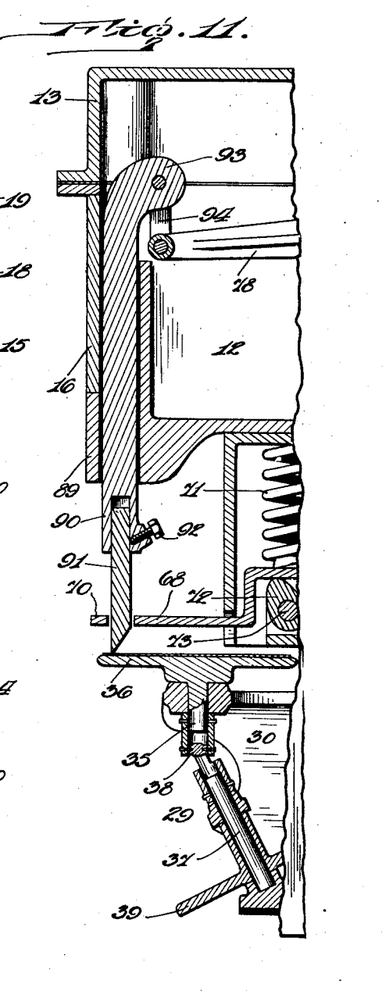
Figure 11 is a fragmentary vertical sectional view on the line 11—11 of Figure 4.
Figure 13:
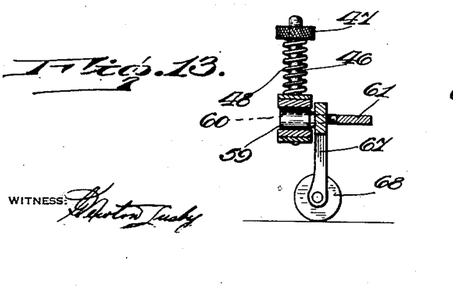
Figure 13 is a similar view on the line 13—13 of Figure 6.

For releasing the jaws 40 and 41 after each lateral movement of the arm 43 in one direction to idly return the same by the action of the spring 43, we provide a cam 59 interposed between the jaws 40 and 41 and fixed to a stub shaft 60 journalled in the arm 43. The outer end of the shaft 60 carries a plate 61 disposed in the path of downward movement of a push bar 62 slidably mounted in the top of the frame structure 30. The top of the push bar 62 carries a head 63 disposed in the path of downward movement of a sliding push rod 64 normally held above the horizontal plane of the head 63 by an expansion spring 65. A rocker arm 66 operable by the cam 27 depresses the push rod 64 twice on each revolution of the cam shaft 18 to operate the cam 59 to spread the jaws 40 and 41, thus releasing the disk 39 immediately after the jaws have moved the same a predetermined distance. When the edge of a shoe to be trimmed is placed upon the turntable 36 as shown in Figure 1 of the drawings, the intermittent movement of the turn-table feeds the shoe for the next cutting operation presently to be described. For supporting the arm 43 during its lateral movement, we provide a fork 67 which depends from the arm in which a wheel 68 is journalled and which rides over the bottom or base of the frame structure. This relieves any strain upon the pivot connection 45 and allows easy, lateral movements of the arm.

Having described the means for imparting intermittent turning movements to the turntable 36, we shall now explain the means by which the shoe edge is held clamped upon the turn-table which includes a presser foot member 68 disposed on a plane above the turn-table and which has its inner end pivoted to a swivel member 69. The outer end of the presser foot is formed with a jaw 70 through which the cutting knife passes and which jaw co-acts with the turntable to hold the shoe edge in a position to be cut. An expansion spring 71 bears down upon the presser foot 68 and tends to move the same to a clamping position while a cam 72 disposed beneath the presser foot serves to lift the same against the tension of the spring to release the shoe edge or work. The cam 72 is fixedly mounted upon a transverse shaft 73 journalled in the side walls of the housing and which carries an arm 74 to which one end of a link 75 is pivotally connected. The other end of the link is pivotally connected to an arm 76 fixed to a rocker shaft 77 journalled in the side walls of the upper housing section. Also fixed to the rocker shaft 77 is a rocker arm 78, one end of which carries a roller 79 for movement over the inner walls of the double face cam 25. The cam 25 operates the rocker arm 78 twice on each revolution which in turn causes the cam 72 to lift the presser foot an equal number of times on each revolution of the shaft 18 against the the action of the spring 71.

Lateral movements are imparted to the presser foot 68 in the same direction to the turn-table and simultaneous therewith while the presser foot is in clamping position to aid in feeding the work after each cutting operation. For this purpose we provide spaced upstanding lugs 80 on the presser foot between which the free end of an actuating arm 81 extends. The arm 81 is capable of lateral swinging movements and is carried on the lower end of a turnable shaft 82. A lever 83 is carried by the top of the shaft 82 and is connected by a pin and slot connection 84 to one end of a push rod 85. The push rod is slidably mounted in a bearing 86 and the other end has a head 87 which rides against the cam 24 and is held thereagainst by an expansion spring 88 interposed between the head and the bearing. It will be seen that the push rod will be depressed against the action of the spring 88 twice on each revolution of the shaft 18 to shift the presser foot laterally in one direction while the spring 88 returns the same and its operating parts in an opposite direction when the presser foot member is in a raised position.

Slidably mounted in a bearing 89 directly above the turntable is a knife holder bar 90 having a socket in its lower end for removably receiving a cutting knife 91 and which is rigidly held in the holder bar by a set screw 92. The top of the holder bar 90 is provided with an inwardly extending head 93 to which one end of a link 94 is pivotally connected, while the lower end of the link is pivotally connected to the free end of rocker arm 78. The rocker arm will operate the knife element causing the same to reciprocate twice on each revolution of the cam 25. The parts are so arranged that the presser foot moves to a depressed position just prior to the movement of the knife into engagement with the work to be cut and releases the work immediately thereafter, between which movements the same is shifted laterally in unison with the intermittent movement of the turntable to feed the work for positioning the same to receive the next cut by the knife.

In practice, the operator places the shoe against the turn-table 36 with the edge of the sole to be cut resting thereupon. The motor 22 is turned on which imparts a continuous movement to the shaft 18 on which the operating cams are mounted. The sequence of operation has been hereinbefore described but it might be well to mention that the presser foot member 68 clamps the sole edge upon the turntable 36 whereupon the knife 91 moves down and cuts the edge, whereupon the presser foot member and turntable move a predetermined distance to feed the shoe to position the edge to receive the next cut by the knife. The working parts for performing the above functions together with their operation have been fully explained and it is not believed necessary to again describe the same. However, by constructing the turn-table and its correlated parts in a single unit and adjustably mounting the same in the housing, the edge of the turntable may be adjusted with respect to the knife for varying the width of the finished edge to be left on the shoe sole after the cutting and trimming of the edge. The unit may also be removed from the housing for oiling and repair purposes.

For preventing the thin piece of leather that is first sewed to the shoe upper, and the new sole that is being cut from separating, a guide 95 is mounted adjacent the edge of the turn-table on the side where the work is fed onto the same. The sole is fed under the guide which also acts as a shield for the hand of an operator when feeding the work onto the turntable.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. In a shoe sole edge trimming machine, a rotatable turn-table adapted to receive the work to be cut, a reciprocable knife, work clamping means co-acting with said turn-table to hold the work thereon, and means for imparting reciprocating movement to said knife, and means for imparting intermittent turning movement to said turn-table and for simultaneously releasing said work clamping means in timed relation to the reciprocating movements of said knife.

2. In a shoe sole edge trimming machine, a rotatable turn-table adapted to receive the work to be cut, a reciprocable knife movable into engagement with the work supported on said table, and means for adjusting the turntable with respect to the knife to vary the distance between the peripheral edge of the turn-table and the cutting edge of said knife.

3. In a shoe sole edge trimming machine, a driven rotatable shaft, a rotatable turn-table, means driven on said shaft for imparting intermittent turning movement to said turn-table, a presser foot member movable against said turn-table to clamp a piece of work thereon, means operable by said driven shaft for moving said presser foot into clamping engagement with said turn-table, means operable by said driven shaft for imparting lateral movement of said presser foot member in unison with the intermittent movement of said turn-table, a reciprocable knife movable into engagement with said turn-table and means operable by said driven shaft for imparting reciprocating movements to said knife.

4. In an edge cutting machine, a driven rotatable shaft, a turn-table, a rotatable friction disk operatively connected to said turn-table, a swingable arm, spring means acting upon said arm to move the same in one direction, spring pressed friction jaws carried by said arm and engageable with opposite sides of said friction disk, means operable by said shaft for moving said arm laterally in one direction against the action of said spring means, said means including a slidable cone shaped member engaging one of the sides of said arm, a push rod operatively connected to said cone shaped member, springs acting against said cone shaped member and push rod, a rocker arm for depressing said push rod and cone member against the action of said springs, and a cam fixed to said driven rotatable shaft for actuating said rocker arm, and means operable by said shaft for releasing said jaws from said friction disk upon the limit of lateral movement of said arm in one direction to allow said spring means to idly return said arm to the limit of its lateral movement in an opposite direction.

5. In an edge cutting machine, a driven rotatable shaft, a turn-table, a rotatable friction disk operatively connected to said turn-table, a swingable arm, spring means acting upon said arm to move the same in one direction, spring pressed friction jaws carried by said arm and engageable with opposite sides of said friction disk, means operable by said shaft for moving said arm laterally in one direction against the action of said spring means, and means operable by said shaft for releasing said jaws from said friction disk upon the limit of lateral movement of said arm in one direction to allow said spring means to idly return said arm to the limit of its lateral movement in an opposite direction, said last means including a cam journalled between said spring pressed jaws, an actuating arm operatively connected to said cam, a push rod in the path of said actuating arm, a spring tending to hold said push rod in a raised position, a rocker arm engageable with said push rod for depressing the same against the action of said spring, and a cam fixed to said driven rotatable shaft and engaging said rocker arm for imparting rocking movements thereto.

6. In an edge cutting machine, a driven rotatable shaft, a turn-table, means operable by said shaft for imparting intermittent turning movement to said turn-table, a presser foot member pivotally supported above said turn-table for vertical and lateral swinging movements, spring means tending to force the free end of said presser foot member into clamping engagement with said turn-table, a turnable cam disposed beneath said presser foot member and engageable therewith, means operatively connected with said cam and driven rotatable shaft for imparting turning movements to said cam to lift said presser foot member against the action of said spring means and to allow said spring means to depress said presser foot member into engagement with said turn-table, and means operable by said driven rotatable shaft for imparting lateral movements to said presser foot member in timed relation to the intermittent movements of said turn-table.

7. In a shoe sole edge cutting machine, a driven rotatable shaft, a turn-table, means operable by said shaft for imparting intermittent turning movement to said turn-table, a presser foot member pivotally supported above said turn-table for vertical and lateral swinging movements, spring means tending to force the free end of said presser foot member into clamping engagement with said turn-table, a turnable cam disposed beneath said presser foot member and engageable therewith, means operatively connected with said cam and driven rotatable shaft for imparting turning movements to said cam to lift said presser foot member against the action of said spring means and to allow said spring means to depress said presser foot member into engagement with said turn-table, and means operable by said driven rotatable shaft for imparting lateral movements to said presser foot member in time relation to the intermittent movements of said turn-table, said last mentioned means including a cam fixedly mounted on said driven rotatable shaft, a spring pressed push rod engaging said last cam, a turnable shaft operatively connected to said push rod, a horizontal arm carried by said shaft, and lugs on said presser foot member between which said arm extends.

8. In a shoe sole edge cutting machine, a driven rotatable shaft, a rotatable turn-table, means operable by said shaft for imparting intermittent turning movement to said turn-table, a slidably mounted knife member movable into engagement with said turn-table, a cam fixed to said driven rotatable shaft, and a rocker arm having one end operatively connected to said slidable knife member and its other end engaging said cam for imparting reciprocating movement to said knife member in timed accord with the intermittent turning movement of said turn-table.

9. An edge cutting machine comprising a housing, a driven rotatable shaft journalled in said housing, a frame structure slidably mounted within said housing and removable therefrom, a turn-table mounted in said frame structure, a reciprocable knife member mounted in said housing for movement into engagement with said turn-table, manually operable means controlled from the exterior of said housing for imparting sliding movement to said frame structure for adjusting said turn-table with respect to said knife member, means operable by said driven rotatable shaft for imparting intermittent turning movements to said turn-table during various adjustments of the same with respect to said knife member, and means operable by said driven rotatable shaft for imparting reciprocating movements to said knife member.

10. An edge cutting machine comprising a housing, a driven rotatable shaft journalled in said housing, a frame structure slidably mounted within said housing and removable therefrom, a turn-table mounted in said frame structure, a reciprocable knife member mounted in said housing for movement into engagement with said turn-table, manually operable means controlled from the exterior of said housing for imparting sliding movement to said frame structure for adjusting said turn-table with respect to said knife member, said manually operable means including a rack provided on said frame structure, a shaft journalled in said housing, a gear fixed to said shaft and meshing with said rack bar, and a manipulating handle on said shaft exteriorly of said housing, means operable by said driven rotatable shaft for imparting intermittent turning movements to said turn-table during various adjustments of the same with respect to said knife member, and means operable by said driven rotatable shaft for imparting reciprocating movements to said knife member.

11. In a shoe sole edge cutting machine, an intermittently rotatable turn-table adapted to receive the edge of the work to be cut, a reciprocable knife, and a downwardly and laterally movable presser member overlying said turn-table and co-acting therewith to hold the work and successively feed the same into position beneath said knife and into the path thereof.

In testimony whereof we have affixed our signatures.

CHARLES A. WIDDER.
GEORGE CODISH.